US012762874B2

(12) United States Patent
Yoo et al.

(10) Patent No.: US 12,762,874 B2
(45) Date of Patent: Oct. 13, 2026

(54) ATHEROSCLEROTIC PLAQUE TISSUE ANALYSIS METHOD AND DEVICE USING MULTI-MODAL FUSION IMAGE

(71) Applicants: KOREA ADVANCED INSTITUTE OF SCIENCE AND TECHNOLOGY, Daejeon (KR); KOREA UNIVERSITY RESEARCH AND BUSINESS FOUNDATION, Seoul (KR)

(72) Inventors: Hongki Yoo, Daejeon (KR); Hyeong Soo Nam, Daejeon (KR); Jin Won Kim, Seoul (KR); Sun Won Kim, Ansan-si (KR)

(73) Assignees: KOREA ADVANCED INSTITUTE OF SCIENCE AND TECHNOLOGY, Daejeon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 435 days.

(21) Appl. No.: 18/553,290

(22) PCT Filed: Mar. 28, 2022

(86) PCT No.: PCT/KR2022/004298
§ 371 (c)(1),
(2) Date: Oct. 31, 2023

(87) PCT Pub. No.: WO2022/211402
PCT Pub. Date: Oct. 6, 2022

(65) Prior Publication Data

US 2024/0185627 A1 Jun. 6, 2024

(30) Foreign Application Priority Data

Mar. 30, 2021 (KR) ........................ 10-2021-0041152

(51) Int. Cl.
*G06V 20/69* (2022.01)
*G06T 7/00* (2017.01)

(52) U.S. Cl.
CPC .......... *G06V 20/698* (2022.01); *G06T 7/0012* (2013.01); *G06T 2207/10064* (2013.01);
(Continued)

(58) Field of Classification Search
CPC . A61B 5/0066; A61B 5/02007; A61B 5/7264; A61B 5/7267; A61B 5/0071;
(Continued)

(56) References Cited

U.S. PATENT DOCUMENTS 9,557,154 B2 * 1/2017 Tearney ............... A61B 5/0071

OTHER PUBLICATIONS

Nam, Hyeong Soo, et al. "Machine-learning-based biochemical characterization of atherosclerotic plaques in intravascular optical coherence tomography-fluorescence lifetime imaging." Diagnostic and Therapeutic Applications of Light in Cardiology 2021. vol. 11621. SPIE, 2021. (Year: 2021).*

(Continued)

*Primary Examiner* — Courtney Joan Nelson
(74) *Attorney, Agent, or Firm* — MH2 Technology Law Group, LLP

(57) ABSTRACT

An operation method of an analysis device operated by at least one processor includes: receiving a fusion image; and classifying tissue components in the fusion image using an artificial intelligence model. The fusion image includes first information obtained by imaging vascular tissue through an optical coherence tomography device, and second information obtained by imaging the vascular tissue through a fluorescence lifetime imaging device. The artificial intelligence model is a model trained to classify tissue components using structural features and fluorescence lifetime image information included in an input image.

16 Claims, 7 Drawing Sheets

(52) U.S. Cl.
CPC ............... *G06T 2207/10101* (2013.01); *G06T 2207/20084* (2013.01); *G06T 2207/30101* (2013.01); *G06V 2201/03* (2022.01)

(58) Field of Classification Search
CPC ..... A61B 3/102; A61B 5/0035; A61B 5/0075; A61B 1/043; A61B 3/12; A61B 3/14; A61B 3/10; A61B 1/3137; A61B 5/6876; A61B 2090/364; A61B 2090/3735; G16H 50/20; G16H 30/40; G16H 50/30; G16H 30/20; G06T 2207/20081; G06T 2207/10101; G06T 2207/30101; G06T 2207/20084; G06T 7/0012; G06T 2207/10064; G06T 2207/30041; G06T 2210/41; G06T 5/60; G06T 7/11; G06V 2201/03; G06V 10/764; G06V 10/82; G06V 20/69; G06V 20/698; G06N 3/0464; G06N 3/045; G06N 3/08
See application file for complete search history.

(56) References Cited

OTHER PUBLICATIONS

Park, Jesung, et al. "A dual-modality optical coherence tomography and fluorescence lifetime imaging microscopy system for simultaneous morphological and biochemical tissue characterization." Biomedical optics express 1.1 (2010): 186-200 (Year: 2010).*
Gessert, Nils, et al. "Plaque classification in coronary arteries from ivoct images using convolutional neural networks and transfer learning." arXiv preprint arXiv:1804.03904 (2018). (Year: 2018).*
Nam, Hyeong Soo, "Combined fluorescence lifetime imaging-optical coherence tomography for in vivo detection and assessment of high-risk atherosclerotic plaque", Hanyang University Graduate School, PhD Thesis, 2019, pp. i-xxiv and 1-168.
Fatakdaw Ala, H. et al. Fluorescence lifetime imaging combined with conventional intravascular ultrasound for enhanced assessment of atherosclerotic plaques: an ex vivo study in human coronary arteries. Journal of cardiovascular translational research. 2015, vol. 8, No. 4, pp. 253-263.
Ughi, G. J. et al. Automated tissue characterization of in vivo atherosclerotic plaques by intravascular optical coherence tomography images. Biomedical optics express. 2013, vol. 4, No. 7, pp. 1014-1030.
International Search Report dated Jul. 11, 2022 for corresponding International Application No. PCT/KR2022/004298, 7 pages (with English translation).
Written Opinion of the International Searching Authority dated Jul. 11, 2022 for corresponding International Application No. PCT/KR2022/004298, 8 pages (with English translation).
European Search Report dated Jan. 31, 2025 for corresponding European Application No. 22781521.4, 20 pages.
Nam et al., "Machine-learning-based biochemical characterization of atherosclerotic plaques in intravascular optical coherence tomography-fluorescence lifetime imaging", Mar. 5, 2021, 3 pages, XP093239994, Retrieved from the Internet: URL:https://www.spiedigitallibrary.org/conference-proceeding-of-spie/11621/2578099/Machine-learning-based-biochemical-characterization-of-atherosclerotic-plaques-in-intravascular/10. 1117/12. 2578099.
Park et al., "A dual-modality optical coherence , tomography and fluorescence lifetime imaging microscopy system for simultaneous morphological and biochemical tissue characterization", Biomedical Optics Express, Aug. 2, 2010, pp. 186-200, XP055309249, DOI:10.1364/BOE.1.000186.
Nam et al., "Multispectral analog-mean-delay fluorescence lifetime imaging combined with optical coherence tomography", 1-15 Biomedical Optics Express, [Online] vol. 9, No. 4, Apr. 1, 2018, pp. 1930-1947, XP093239928, United States A SSN: 2156-7085, DOI: 10.1364/BOE.9.001930.
Lee et al., "Comprehensive intravascular imaging of atherosclerotic plaque in vivo using optical coherence tomography and fluorescence lifetime imaging", Scientific Reports, Sep. 28, 2018, vol. 8, No. 1, 12 pages, AP093239979, DOI: 10.1038/s41598-018-32951-9.
Phipps et al., "A Fluorescence Lifetime Imaging Classification Method to Investigate the Collagen to Lipid Ratio in Fibrous Caps of Atherosclerotic Plaque", Lasers in Surgery and Medicine, Aug. 6, 2012, vol. 44, No. 7, pp. 564-571.

* cited by examiner

ATHEROSCLEROTIC PLAQUE TISSUE ANALYSIS METHOD AND DEVICE USING MULTI-MODAL FUSION IMAGE

CROSS-REFERENCE TO RELATED APPLICATIONS

This application is a U.S. National Stage application of PCT/KR2022/004298 filed 28 Mar. 2022, which claims priority to Korean Application No. 10-2021-0041152 filed 30 Mar. 2021, the entire disclosures of which are hereby incorporated by reference in their entireties.

TECHNICAL FIELD

The present disclosure relates to artificial intelligence image analysis.

BACKGROUND ART

Optical coherence tomography (OCT) is a technology for imaging tissue with interference between light reflected and returned from a mirror of a reference arm and light scattered and returned from tissue of a sample arm. An OCT imaging is widely used clinically for vascular microstructural analysis or post-stent evaluation because it contains high-resolution structural information of coronary arteries within the cardiovascular system. However, there are limitations in obtaining, through the OCT imaging, biochemical information of atherosclerotic plaques, which are biochemically complex and diversely generated, and information on an inflammatory reaction or the like for evaluating a risk of rupture of atherosclerotic plaques.

In order to complement these limitations, a fusion imaging technology in which near-infrared fluorescence imaging (NIRF) is fused with the optical coherence tomography has been proposed, but the fusion imaging technology requires the use of a contrast medium to obtain information on atherosclerotic plaques, which has limitations in clinical trials and tests.

Meanwhile, ultraviolet-based fluorescence lifetime imaging (FLIm) is a technology for measuring a decay rate of autofluorescence generated in tissue itself, and is advantageous in that biochemical information of tissue can be acquired without a contrast medium. However, when the optical coherence tomography and fluorescence lifetime imaging are fused together, it is required to use autofluorescence of tissue, rather than detecting a signal of a specific component, which causes a problem to be solved in that it is not easy to intuitively analyze images due to the large amount of information contained in multi-channel fluorescence signals.

DISCLOSURE

Technical Problem

The present disclosure attempts to provide methods and devices capable of acquiring a fusion image of a blood vessel through an imaging system into which a multimodal technology is fused, and quantitatively analyzing components of atherosclerotic plaque tissue from the fusion image using an artificial intelligence model.

Specifically, the present disclosure attempts to provide methods and devices capable of training an artificial intelligence model that comprehensively analyzes structural information reflecting optical scattering and absorption characteristics of atherosclerotic plaques included in an optical coherence tomography image and biochemical information of tissue components included in a fluorescence lifetime image, analyzing compositions of atherosclerotic plaque tissue using the trained artificial intelligence model, detecting atherosclerotic plaques based on an analysis result containing information on an inflammatory response in a blood vessel, and predicting a risk of rupture.

Technical Solution

According to an exemplary embodiment, an operation method of an analysis device operated by at least one processor includes: receiving a fusion image; and classifying tissue components in the fusion image using an artificial intelligence model. The fusion image includes first information obtained by imaging vascular tissue through an optical coherence tomography device, and second information obtained by imaging the vascular tissue through a fluorescence lifetime imaging device. The artificial intelligence model is a model trained to classify tissue components using structural features and fluorescence lifetime image information included in an input image.

The artificial intelligence model may include: a convolutional neural network (CNN) model which is trained to receive an optical coherence tomography image included in the input image and extract structural features in the optical coherence tomography image; and a classifier which is trained to receive the structural features output from the CNN model and the fluorescence lifetime image information included in the input image, and output tissue components for the input image. The optical coherence tomography image input to the CNN model may represent the first information included in the fusion image in a polar coordinate domain.

The artificial intelligence model may be implemented as an extended CNN model that receives multimodal images representing parameters included in the first information and the second information, and extracts feature values of the multimodal images.

The second information may include fluorescence lifetime images of multi-channels mapped to emission light having different wavelengths, and each of the fluorescence lifetime images may include a fluorescence lifetime and a fluorescence intensity acquired in a corresponding one of the channels.

The tissue components may include at least one of lipids, macrophages, smooth muscle cells, fibrous plaques, calcium, cholesterol crystals, and normal blood vessel walls.

The operation method may further include estimating an inflammatory response based on quantitative information of macrophages among the tissue components in the fusion image, and classifying tissue containing the macrophages as inflammatory tissue or lipid tissue mixed with inflammation.

The operation method may further include detecting atherosclerotic plaques based on the tissue components in the fusion image.

The operation method may further include predicting a possibility of rupture of the atherosclerotic plaques based on the tissue components in the fusion image.

In the predicting of the possibility of rupture, the possibility of rupture may be predicted based on a ratio between tissue components that increase the possibility of rupture and tissue components that contribute to stabilization among the tissue components in the fusion image.

According to another exemplary embodiment, an operation method of an analysis device operated by at least one processor includes: receiving a fusion image including first information obtained by imaging vascular tissue through an optical coherence tomography device, and second information obtained by imaging the vascular tissue through a fluorescence lifetime imaging device; extracting structural features of the vascular tissue from the first information; classifying tissue components of the vascular tissue using the structural features and fluorescence lifetime information included in the second information; and detecting atherosclerotic plaques based on the components of the vascular tissue.

The second information may include fluorescence lifetime images of multi-channels mapped to emission light having different wavelengths, and each of the fluorescence lifetime images may include a fluorescence lifetime and a fluorescence intensity acquired in a corresponding one of the channels.

The tissue components may include at least one of lipids, macrophages, smooth muscle cells, fibrous plaques, calcium, cholesterol crystals, and normal blood vessel walls.

The operation method may further include estimating an inflammatory response based on quantitative information of macrophages among the tissue components of the vascular tissue, and classifying tissue containing the macrophages as inflammatory tissue or lipid tissue mixed with inflammation.

The operation method may further include predicting a possibility of rupture of the atherosclerotic plaques based on the tissue components of the vascular tissue.

In the predicting of the possibility of rupture, the possibility of rupture is predicted based on a ratio between tissue components that increase the possibility of rupture and tissue components that contribute to stabilization among the tissue components in the fusion image.

Advantageous Effects

The analysis device according to the present disclosure is capable of detecting atherosclerotic plaques by quantitatively analyzing components of vascular tissue and atherosclerotic plaque tissue using fusion images, and particularly, predicting a possibility of rupture of atherosclerotic plaques by analyzing an inflammatory response.

Unlike optical coherence tomography (OCT) or intravascular ultrasonography (IVUS), the analysis device according to the present disclosure is capable of acquiring a fusion image and simultaneously providing quantitative and comprehensive information about lipids, macrophages, smooth muscle cells, fibrous plaques, etc., which are components of atherosclerotic plaque tissue.

By detecting atherosclerotic plaques and predicting a possibility of rupture, the analysis device according to the present disclosure can be used in diagnosing a cardiovascular disease, can contribute to personalized treatment, and can contribute to increasing pathophysiological understanding of atherosclerotic plaques.

By using a fluorescence lifetime image and an optical coherence tomography image, the analysis device according to the present disclosure is capable of providing an imaging result with improved resolution and processing speed as compared with intravascular ultrasonography (IVUS).

By using a fluorescence lifetime image, the analysis device according to the present disclosure does not need to administer a contrast medium to a patient, unlike other modalities.

MODE FOR INVENTION

Hereinafter, exemplary embodiments of the present disclosure will be described in detail with reference to the accompanying drawings, so that they can be easily carried out by those of ordinary skill in the art to which the present disclosure pertains. However, the present disclosure may be implemented in various different forms and is not limited to the exemplary embodiments described herein. In addition, in order to clearly explain the present disclosure, parts irrelevant to the description will be omitted, and like components will be denoted by like reference signs throughout the specification.

Throughout the specification, when a certain part is referred to as "including" a certain component, this implies the inclusion of another component, rather than excluding another component, unless specifically stated to the contrary. In addition, the term "unit", "-er", or "module" used in the specification refer to a unit for processing at least one function or operation, which may be implemented by hardware, software, or a combination thereof.

Multiple modes may be selected from a variety of cardiovascular imaging technologies, and fluorescence lifetime imaging (FLIm) and optical coherence tomography (OCT) will be described as examples in the description. In addition, fluorescence lifetime imaging and intravascular ultrasonography (IVUS) may be fused, or fluorescence lifetime imaging, optical coherence tomography, and intravascular ultrasonography may be fused.

Figure 1:
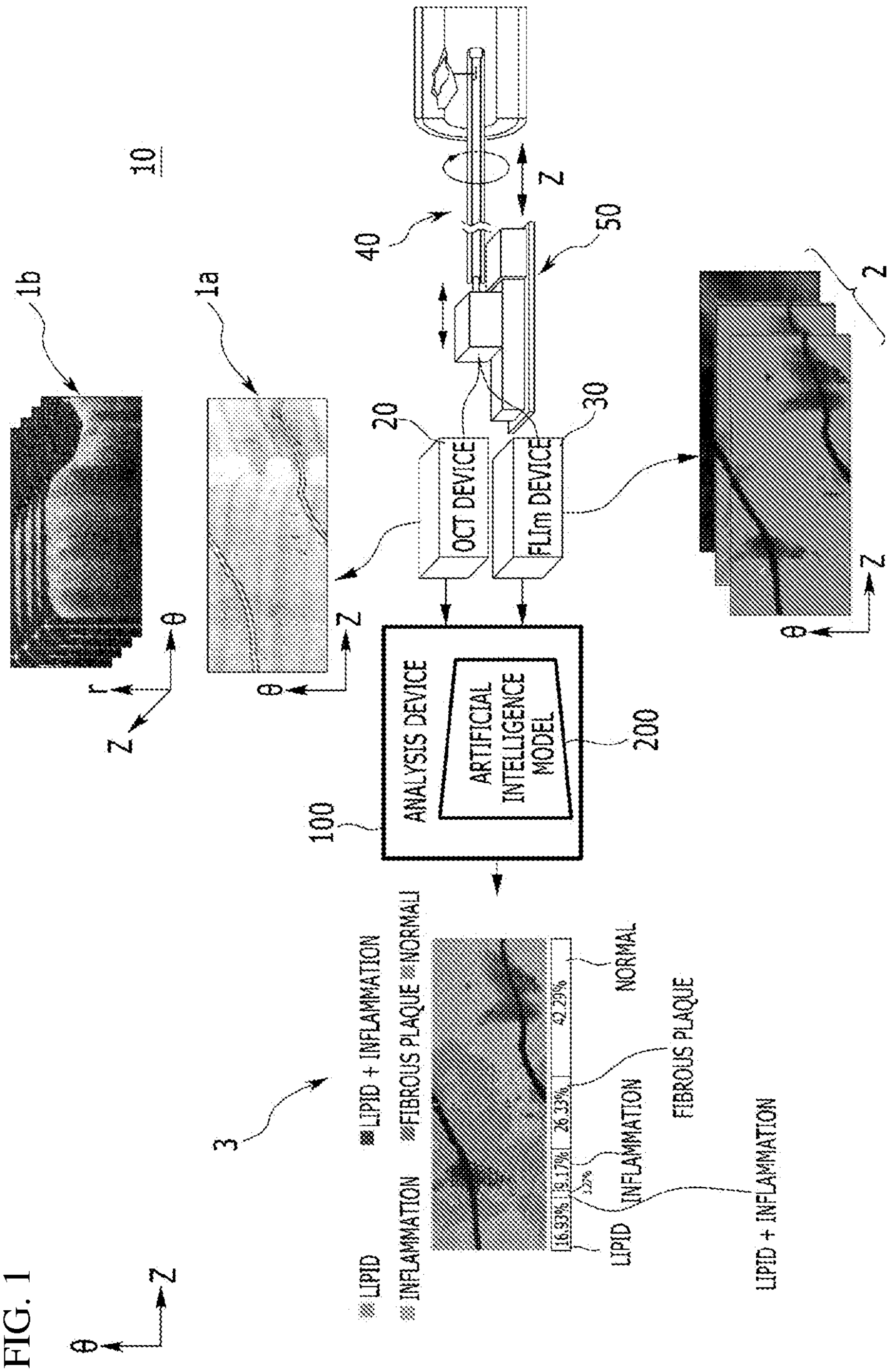
FIG. 1 is a conceptual diagram of a multimodal imaging system according to an exemplary embodiment.
Figure 2:
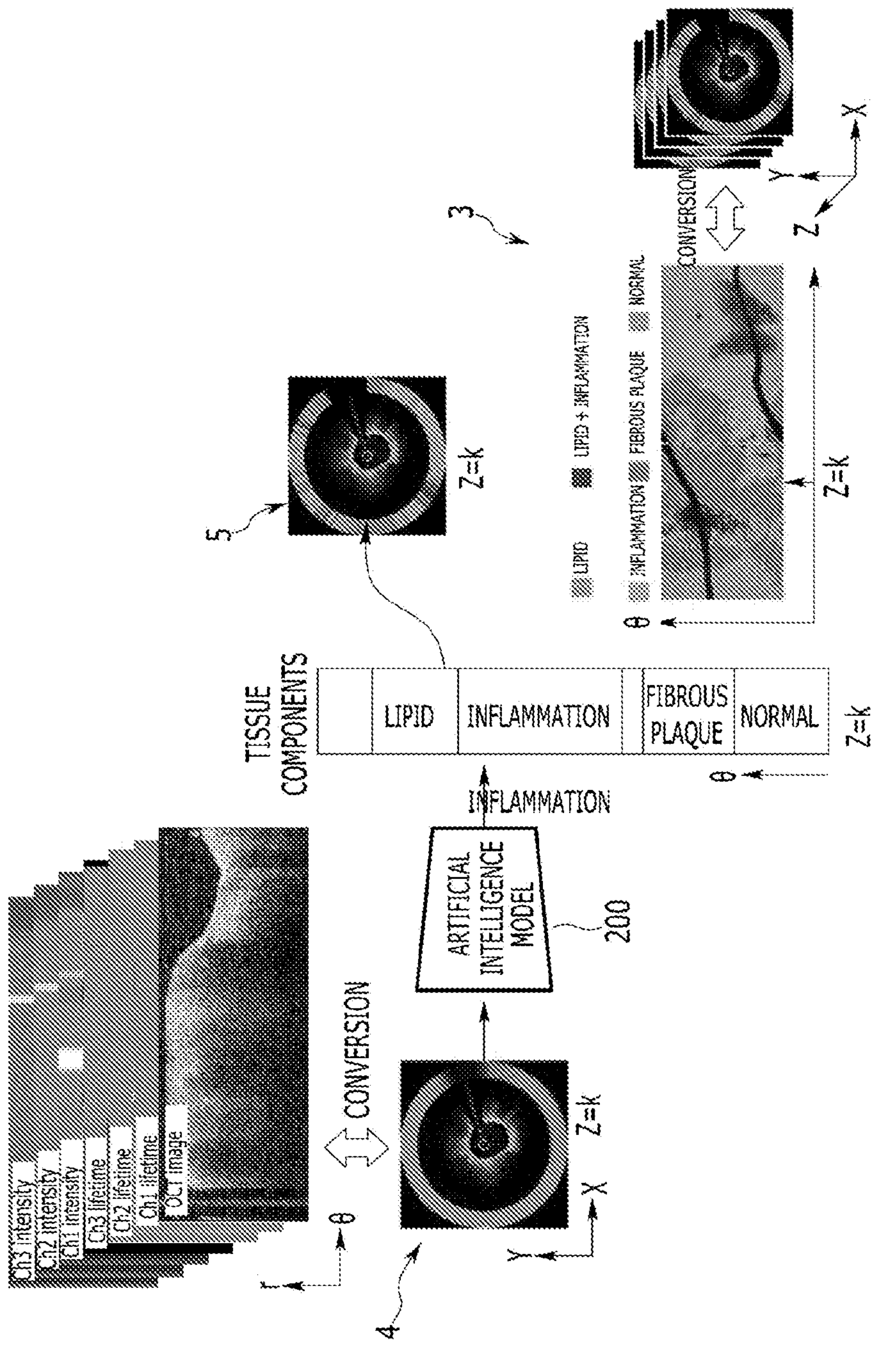
FIG. 2 is a conceptual diagram describing analysis using an artificial intelligence model according to an exemplary embodiment.

FIG. 1 is a conceptual diagram of a multimodal imaging system according to an exemplary embodiment. FIG. 2 is a conceptual diagram describing analysis using an artificial intelligence model according to an exemplary embodiment.

Referring to FIG. 1, the multimodal imaging system 10 may include an optical coherence tomography (OCT) device 20 and a fluorescence lifetime imaging (FLIm) device 30, and may include a measurement device 40 that emits light to tissue and acquires reflected light and a rotary joint device 50 that joins the optical coherence tomography device 20 and the fluorescence lifetime imaging device 30 to the measurement device 40. The measurement device 40 may be a probe or catheter that can be inserted into a blood vessel, emits light received from the rotary joint device 50 to the tissue, and transmits the light obtained from the tissue through a designated path.

The multimodal imaging system 10 may include an analysis device 100 operated by at least one processor. Alternatively, the analysis device 100 may be implemented separately from the multimodal imaging system 10, and the multimodal imaging system 10 may transmit measurement results of the optical coherence tomography device 20 and the fluorescence lifetime imaging device 30 to the analysis device 100, and may include a computing device that performs the transmission of the measurement results.

The optical coherence tomography device 20 outputs light from a light source to the measurement device 40 and images tissue using light returned from the measurement device 40. The tissue may be imaged using an interference signal obtained by interference between light reflected and returned from a mirror of a reference arm and light scattered and returned from the tissue. Therefore, information imaged through the optical coherence tomography device 20 may include structural information of the vascular tissue. For reference, an original optical coherence tomography image acquired through the measurement device 40 may be a three-dimensional image having a Z-axis (a moving direction of the measurement device), an angular axis (θ, a rotation direction of the measurement device), and a radial axis (r, a depth direction), and only a maximum brightness value for each 0 may be extracted from the original three-dimensional image to create a 2D maximum projection mapping image 1*a* or an OCT polar coordinate image 1*b*. The 2D maximum projection mapping image 1*a* is an image with the horizontal axis being the Z-axis and the vertical axis being the angular axis, and the OCT polar coordinate image 1*b* may be an image of a polar coordinate domain with the horizontal axis being the angular axis and the vertical axis being the radial axis. In the description, the 2D maximum projection mapping image 1*a* and the OCT polar coordinate image 1*b* may simply be called an optical coherence tomography image, without distinguishing their image coordinate systems.

The fluorescence lifetime imaging device 30 outputs light from a light source to the measurement device 40, and images tissue using light returned from the measurement device 40. The tissue may be imaged using a fluorescence lifetime and a fluorescence intensity. In this way, since the fluorescence lifetime imaging device 30 uses the fact that each molecule or substance has a unique emission decay time (fluorescence lifetime) with respect to emission light, biochemical information of tissue components can be obtained from fluorescence lifetime images.

The fluorescence lifetime imaging device 30 may include a multi-channel wavelength spectroscopy module, through which fluorescence lifetime images 2 of multi-channels (e.g., channel 1, channel 2, and channel 3) mapped to emission light having different wavelengths can be generated. For example, the fluorescence lifetime images 2 may include a channel 1 image that mainly contains collagen information, a channel 2 image that mainly contains elastin and macrophage information, and a channel 3 image that mainly contains lipid information. For reference, the fluorescence lifetime images 2 may be actually acquired original images, with the horizontal axis representing the Z-axis (the moving direction of the measurement device) and the vertical axis representing the angular axis (θ, the rotation direction of the measurement device)

The analysis device 100 receives a fusion image, and classifies tissue components in the fusion image using an artificial intelligence model 200. The artificial intelligence model 200 is a model trained to classify tissue components using structural features and fluorescence lifetime image information included in the input image. The fusion image may include information obtained by imaging vascular tissue through the optical coherence tomography device 20 and information obtained by imaging vascular tissue through the fluorescence lifetime imaging device 30. Here, the information imaged through the optical coherence tomography device 20 can be expressed as an optical coherence tomography image. The information imaged through the fluorescence lifetime imaging device 30 may be a fluorescence lifetime and a fluorescence intensity, or may be expressed as a fluorescence lifetime image including a fluorescence lifetime and a fluorescence intensity.

Specifically, the analysis device 100 may receive an optical coherence tomography image acquired from the optical coherence tomography device 20 and a fluorescence lifetime image acquired from the fluorescence lifetime imaging device 30, and generate a fusion image in which the optical coherence tomography image and the fluorescence lifetime image are mapped to the same location (the same Z, θ values). The analysis device 100 may receive an interference signal measured by the optical coherence tomography device 20 and a fluorescence lifetime and a fluorescence intensity measured by the fluorescence lifetime imaging device 30, and generate a fusion image in which the information is concatenated. Alternatively, the analysis device 100 may receive a fusion image in which an optical coherence tomography image and a fluorescence lifetime image are mapped.

The analysis device 100 generates an analysis result 3 including tissue components and quantitative information thereof from the fusion image. In the analysis result 3, the tissue components may be displayed in a visually distinguishable manner, and quantitative information of each component may be displayed. For example, the analysis device 100 may provide an analysis result 3 in which lipid is analyzed as 16.93%, lipid and inflammation is analyzed as 3.27%, inflammation is analyzed as 9.17%, fibrous plaque is analyzed as 26.3%, and normal is analyzed as 42.29%, while the analyzed lipid area, lipid and inflammation area, inflammation area, fibrous plaque area, and normal area are distinguished from each other by different colors.

To this end, the analysis device 100 uses the artificial intelligence model 200 trained to extract features related to tissue components from the fusion image in which the optical coherence tomography image and the fluorescence lifetime image are mapped, and classify the components from the features. At this time, the artificial intelligence model 200 may be implemented in various forms capable of extracting tissue components from an input image for each Z value, and predicting tissue components based on an angle for each Z value. An analysis result 3 for the entire measurement direction may be generated by accumulating tissue components based on angles along the entire Z-axis.

The analysis device 100 does not need to directly train the artificial intelligence model 200 while being equipped with the trained artificial intelligence model 200, but it may be described for convenience of explanation that the analysis device 100 trains the artificial intelligence model 200.

The analysis device 100 includes at least one processor, and includes hardware and software capable of performing the operations according to the present disclosure as the processor executes instructions. A computer program may be stored in a non-transitory computer readable storage medium, including instructions described to cause the processor to execute the operations according to the present disclosure. The computer program may be downloaded over a network or sold in the form of a product.

Referring to FIG. 2, the artificial intelligence model 200 may be a model that has learned a task of extracting features and a task of classification into tissue components in response to an input. The input to the artificial intelligence model 200 is a fusion image 4 in which an optical coherence tomography image (an OCT image) and a fluorescence lifetime image are fused, and the output from the artificial intelligence model 200 may include classified tissue components and quantitative information thereof. Here, the artificial intelligence model 200 may extract tissue components in an angular direction of a specific Z value (Z=k) from the fusion image 4 at the specific Z value (Z=k). The tissue components may include, for example, lipids, macrophages, smooth muscle cells, fibrous plaques, calcium, cholesterol crystals, normal blood vessel walls, etc. The quantitative information may include a probability value for each tissue component.

The fusion image 4 at the specific Z value (Z=k) may be converted into multimodal images using information included therein. The multimodal images include an optical coherence tomography image (an OCT image), a fluorescence lifetime image and a fluorescence intensity image of channel 1, a fluorescence lifetime image and a fluorescence intensity image of channel 2, and a fluorescence lifetime image and a fluorescence intensity of channel 3. Alternatively, the multimodal images may further include an intensity ratio image.

For reference, since the catheter scanning method is a spiral-type scanning method in which a catheter is pulled from behind while rotating at a high speed, the information of the fluorescence lifetime image may be displayed in the form of an outer ring on the optical coherence tomography image in an XY orthogonal coordinate system in order to reflect the scanning method to the fusion image 4. The analysis device 100 may provide an output-visualized image 5 in which the tissue components output from the artificial intelligence model 200 are displayed in the outer ring of the optical coherence tomography image in the XY orthogonal coordinate system.

The analysis device 100 may provide an analysis result 3 by processing the information output from the artificial intelligence model 200. The analysis result 3 may include tissue components classified for the fusion image and quantitative information (a probability value) of each component. Additionally, the analysis result 3 may include an inflammatory response estimated through a macrophage distribution amount.

In the analysis result 3, tissue components may be visually displayed in a coordinate system where the horizontal axis is a Z-axis and the vertical axis is an angular axis. In addition, in the analysis result 3, a ratio between the tissue components may be displayed. The analysis result 3 may be converted into an output-visualized image 5. In the output-visualized image 5, tissue components and quantitative information of each component at a specific point (Z=k) may be displayed in visually distinguishable manner in the form of a ring.

The artificial intelligence model 200 may comprehensively analyze structural information reflecting optical scattering and absorption characteristics of atherosclerotic plaques included in the optical coherence tomography image, and biochemical information of the tissue components included in the fluorescence lifetime images. In fact, tissue with only lipids distributed, tissue with only inflammation-related macrophages distributed, and tissue with both lipids and macrophages distributed have different fluorescence signals, making it possible to classify tissue components based on fluorescence lifetime and fluorescence intensity.

Through the analysis result 3 using the artificial intelligence model 200, the analysis device 100 may detect atherosclerotic plaques. Additionally, the analysis device 100 may predict a possibility of rupture of atherosclerotic plaques and diagnose high-risk atherosclerotic plaques through the analysis result 3. The possibility of rupture of atherosclerotic plaques may be calculated as a high risk of a lesion. The high risk of the lesion may be determined by a relative proportion of a high-risk component of the lesion. That is, the possibility of rupture of atherosclerotic plaques may be calculated based on proportions of lipids, macrophages, calcium, cholesterol crystals, and the like that increase the possibility of rupture, and proportions of fibrous plaques and the like that contribute to stabilization, among the tissue components included in the analysis result 3.

The artificial intelligence model 200, which is a machine learning model that learns at least one task, may be implemented as a computer program executed by the processor. The artificial intelligence model 200 may be formed using various models according to the input data, the task type, and the learning method.

The artificial intelligence model 200 may learn a task of extracting structural features reflecting the optical scattering and absorption characteristics of atherosclerotic plaques included in the optical coherence tomography image, and a task of classifying tissue components based on the structural features in the optical coherence tomography image and biochemical features of fluorescence lifetime images. The artificial intelligence model 200 receives a multimodal fusion image, the fusion image including an optical coherence tomography image and a fluorescence lifetime image.

The learning data of the artificial intelligence model 200 may include fusion images with labels. Each fusion image is divided into lipids, macrophages, smooth muscle cells, fibrous plaques, calcium, cholesterol crystals, and normal blood vessel walls, which are components of atherosclerotic plaque tissue, and the tissue components are annotated on the image. Here, it is not easy to annotate tissue components in the fusion image, but the tissue components may be annotated by acquiring an actual tissue staining image in addition to the optical coherence tomography image and the fluorescence lifetime image, and matching the shape, lipid emphasis, macrophage immunity, and the like contained in the actual tissue staining image to the fusion image.

Figure 3:
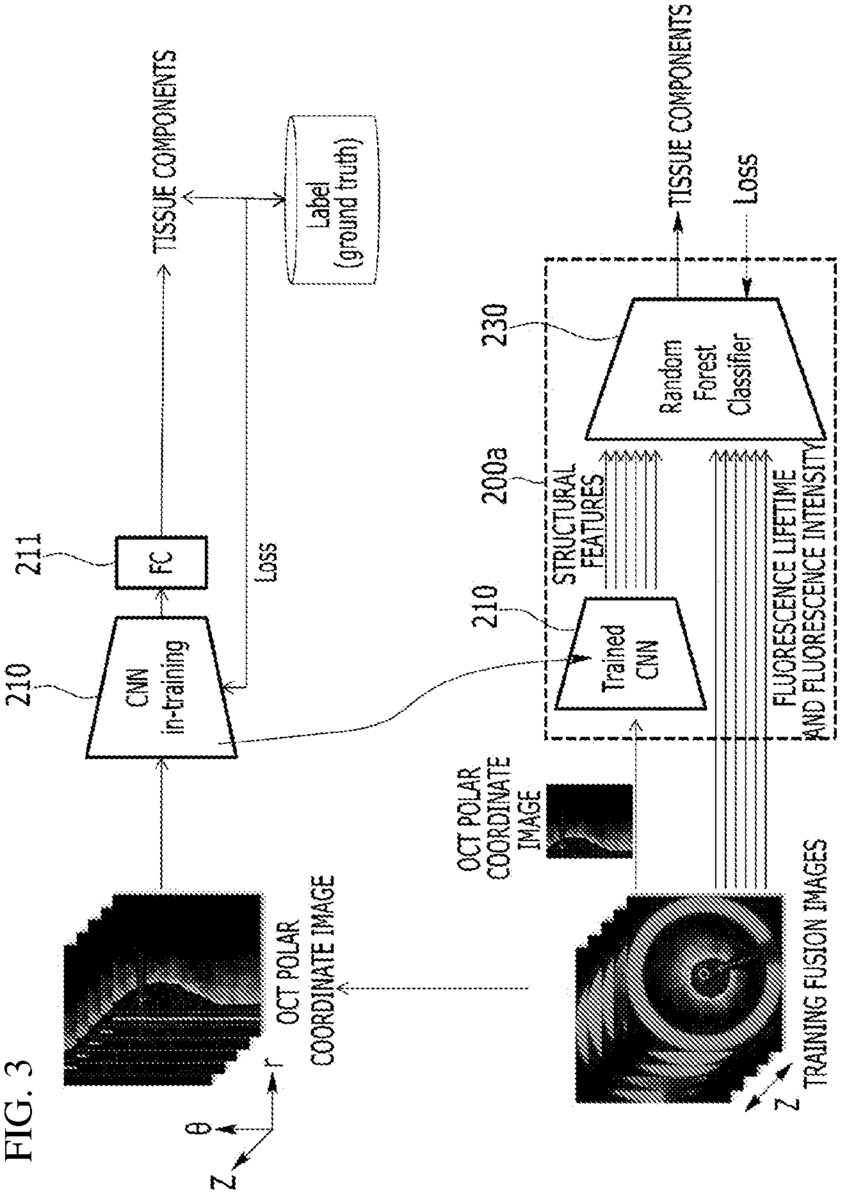
FIGS. 3 and 4 are diagrams illustrating an artificial intelligence model and a method of training the artificial intelligence model, respectively, according to an exemplary embodiment.
Figure 4:
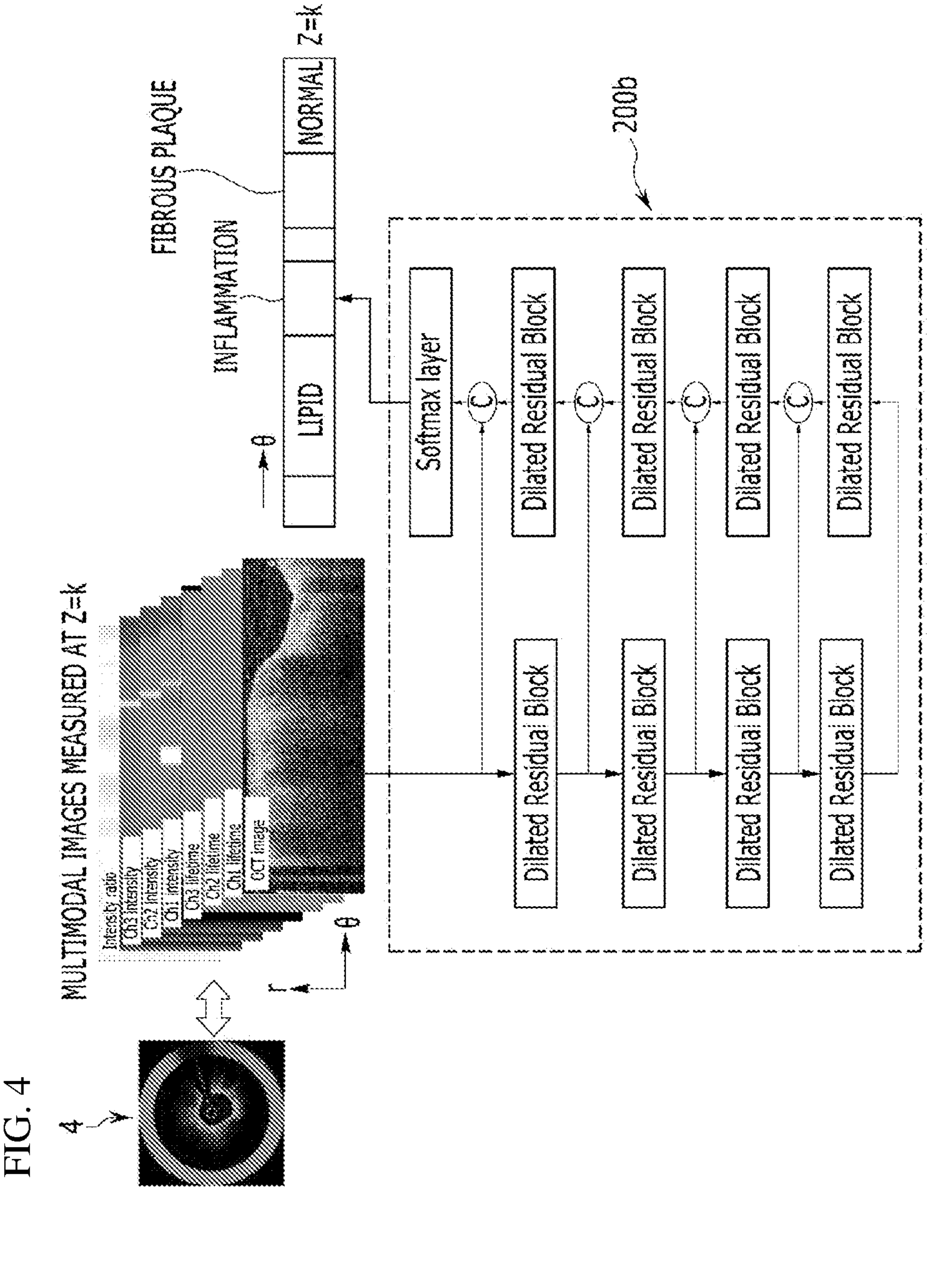

FIGS. 3 and 4 are diagrams illustrating an artificial intelligence model and a method of training the artificial intelligence model, respectively, according to an exemplary embodiment.

Referring to FIG. 3, as an exemplary embodiment of the artificial intelligence model 200, an artificial intelligence model 200*a* includes a convolutional neural network (CNN) model 210 that extracts structural features in an input image, and a random forest classifier 230 that classifies tissue components using input feature values. The CNN model 210 may be implemented as ResNet using a residual block, but may also be implemented as another type of CNN model. The input image is a fusion image measured for each Z value, tissue components for each angle at the Z value are output with respect to the input image, and an analysis result for all input images may be generated by accumulating outputs based on Z values.

The artificial intelligence model 200*a* is trained using learning data including fusion images consecutively measured along the Z-axis, receives a fusion image in Z-axis units, and outputs tissue components for the input image. To this end, the CNN model 210 receives an optical coherence tomography image from the learning data and learns to extract structural features included in the input image. At this time, the CNN model 210 may be configured to extract a convolutional feature value representing each axial profile from the input image. The CNN model 210 may perform supervised learning that minimizes output and label loss.

The CNN model 210 may be used as a feature value extractor of the artificial intelligence model 200*a* after learning to extract structural features from the input image in a state where a fully connected layer (FC) is added to the final stage. At this time, the fully connected layer has as many nodes as the number of feature values to be extracted from the input image, which may be equal to the number of tissue components to be classified by the artificial intelligence model 200*a* for the input image. Meanwhile, since tissue components may be affected by adjacent components, the CNN model 210 may receive a polar coordinate image obtained by converting an optical coherence tomography image into a radial axis-angle domain (r, θ).

The random forest classifier 230 of the artificial intelligence model 200*a* receives structural features of a blood vessel in the input image and fluorescence lifetime image parameters including a fluorescence lifetime and a fluorescence intensity for each channel obtained from the blood vessel, and learns to classify tissue components for the input image. The random forest classifier 230 learns random forest classification using data from the input image as an input and using one-hot vectors for specific components as an output. At this time, the random forest classifier 230 may provide component probabilities based on an angle of the input image, as described with reference to FIG. 2. Based on the classification probabilities of the components output from the random forest classifier 230, an image in which a classification result for the angle is visually expressed may be generated.

At this time, the random forest classifier 230 may receive structural features in the input image from the trained CNN model 210. In extracting the structural features in the input image, the trained CNN model 210 may receive a polar coordinate image obtained by conversion into a radius-angle domain (r, θ) included in the fusion image, in the same manner as it performs learning.

The random forest classifier 230 may receive a fluorescence lifetime and a fluorescence intensity for each channel extracted from the fluorescence lifetime image included in the input image. In a case where the fluorescence lifetime images include a channel 1 image mainly containing collagen information, a channel 2 image mainly containing elastin and macrophage information, and a channel 3 image mainly containing lipid information, the random forest classifier 230 may receive fluorescence lifetimes and fluorescence intensities (six measurement values) measured in the three channels, respectively, as feature values.

In this way, the random forest classifier 230 learns to classify tissue components using the structural feature values extracted from the optical coherence tomography image and six measurement values obtained from the fluorescence lifetime images. Therefore, by using both the structural information and the biochemical information, good classification performance is provided in medical images where noise is prominent.

The trained artificial intelligence model 200*a* may receive a fusion image including an optical coherence tomography image and a fluorescence lifetime image, and output components of tissue for which the fusion image is captured. The imaged tissue is classified into lipids, macrophages, smooth muscle cells, fibrous plaques, calcium, cholesterol crystals, normal blood vessel walls, etc., and a quantitative proportion of each component may be calculated.

Referring to FIG. 4, as another exemplary embodiment of the artificial intelligence model 200, an artificial intelligence model 200*b* may output probability values of tissue components from feature values of multimodal images acquired from a blood vessel.

The artificial intelligence model 200*b* may receive multimodal images obtained by concatenating an optical coherence tomography image and fluorescence lifetime images. The artificial intelligence model 200*b* may receive multimodal images obtained by conversion into radial axis-angle domains (r, θ).

The multimodal images may represent various parameters included in a fusion image 4, and may include, for example, an optical coherence tomography image (an OCT image), a fluorescence lifetime image and a fluorescence intensity image of channel 1, a fluorescence lifetime image and a fluorescence intensity image of channel 2, and a fluorescence lifetime image and a fluorescence intensity of channel 3. Alternatively, the multimodal images may further include an intensity ratio image.

The artificial intelligence model 200*b* may receive multimodal images of the radial axis-angle domains (r, θ), extract feature values of the multimodal images, and output probability values of tissue components in a final softmax layer. At this time, information in the radial-axis (r) direction disappears, and component probabilities depending on angles of input images may be output. The artificial intelligence model 200*b* may be implemented based on an extended CNN, for example, an extended CNN of a U-net structure.

Figure 5:
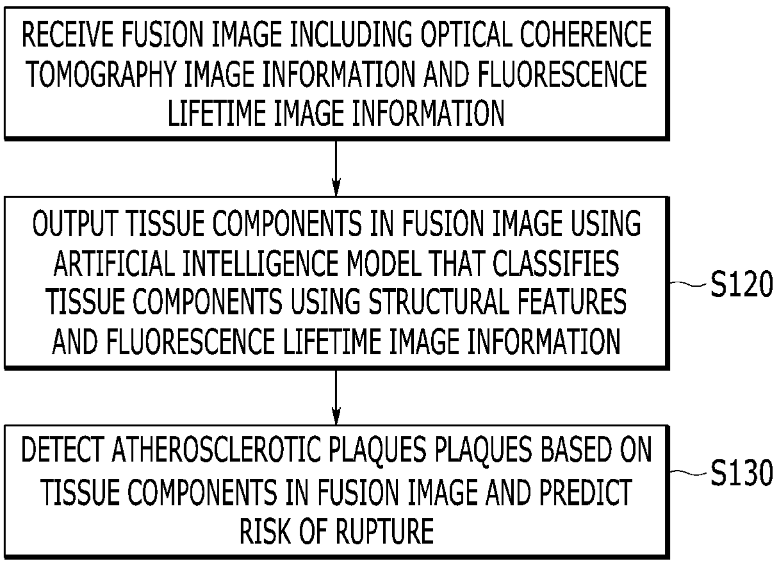
FIG. 5 is a flowchart of a method for analyzing atherosclerotic plaques tissue according to an exemplary embodiment.

FIG. 5 is a flowchart of a method for analyzing atherosclerotic plaques tissue according to an exemplary embodiment.

Referring to FIG. 5, the analysis device 100 operated by at least one processor receives a fusion image including optical coherence tomography image information and fluorescence lifetime image information (S110). The fusion image includes information obtained by imaging the same vascular tissue through the optical coherence tomography device 20 and through the fluorescence lifetime imaging device 30. The fluorescence lifetime imaging device 30 may output multi-channel fluorescence lifetime images mapped to emission light having different wavelengths.

The analysis device 100 outputs tissue components in the fusion image using the artificial intelligence model 200 that has learned a task of classifying the tissue components using structural features and the fluorescence lifetime image information (S120). The artificial intelligence model 20 may classify tissue components using the structural features in the optical coherence tomography image included in the fusion image and the fluorescence lifetime image information (fluorescence lifetime and fluorescence intensity). The analysis device 100 may convert the optical coherence tomography image information included in the fusion image into a polar coordinate image, and input the polar coordinate image into the artificial intelligence model 200. In addition, the analysis device 100 may extract a fluorescence lifetime and a fluorescence intensity measured for each channel from the fluorescence lifetime image information included in the fusion image, and input the fluorescence lifetime and the fluorescence lifetime into the artificial intelligence model 200. To this end, like the artificial intelligence model 200*a* of FIG. 3, the artificial intelligence model 200 may include a random forest classifier 230 that classifies tissue components from the structural features and the fluorescence lifetime features in the fusion image. The structural features in the fusion image may be extracted by applying the CNN model 210 to the optical coherence tomography image, and a fluorescence lifetime and a fluorescence intensity in the fluorescence lifetime image of the fusion image may be used as the fluorescence lifetime features. Like the artificial intelligence model 200*b* of FIG. 4, the artificial intelligence model 200 may be a CNN-based model that outputs probability values of tissue components from multimodal images included in the fusion image.

The analysis device 100 detects atherosclerotic plaques based on the tissue components in the fusion image and predicts a risk of rupture (S130).

Figure 6:
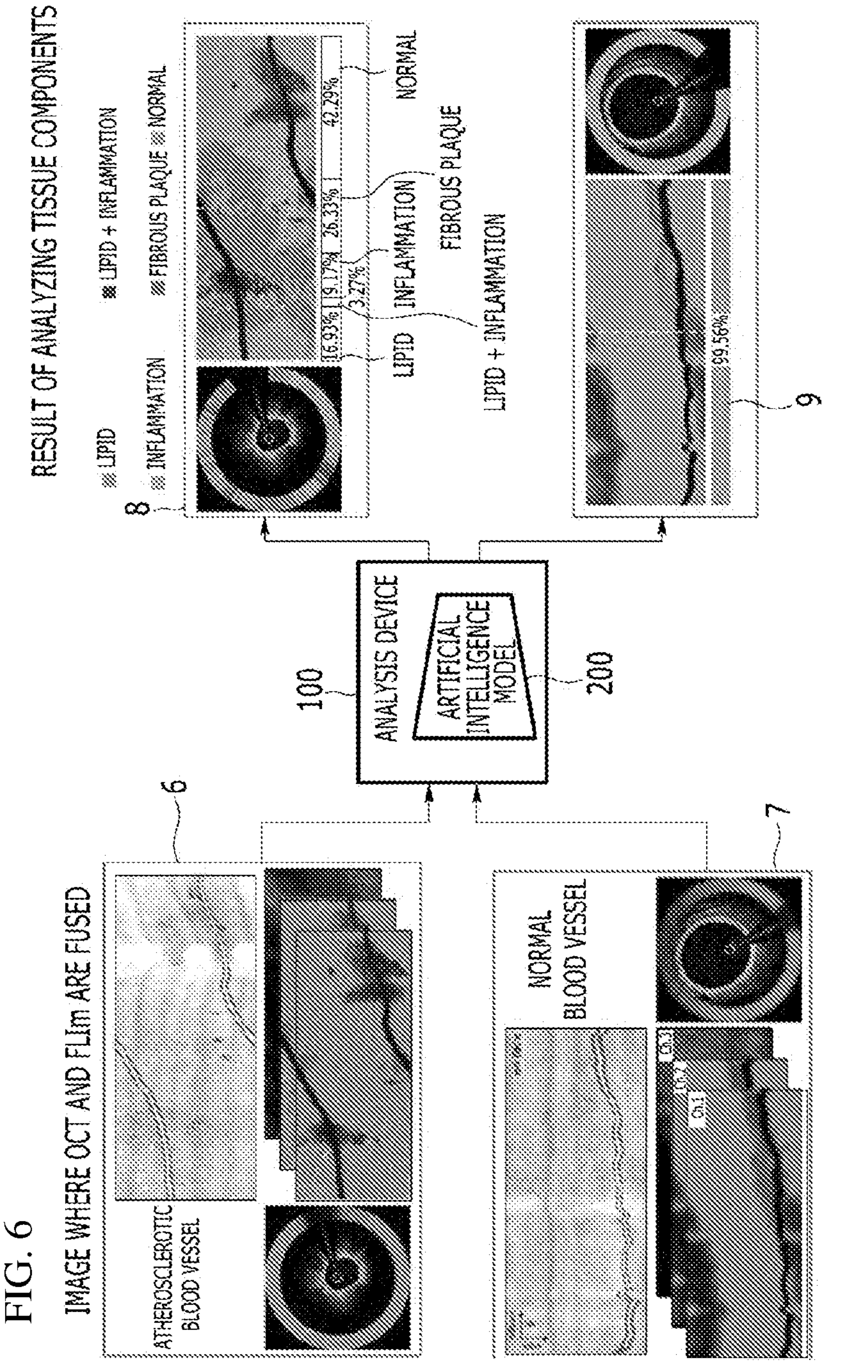
FIG. 6 is a diagram describing a result of analyzing atherosclerotic plaque tissue according to an exemplary embodiment.

FIG. 6 is a diagram describing a result of analyzing atherosclerotic plaque tissue according to an exemplary embodiment.

Referring to FIG. 6, the analysis device 100 including the artificial intelligence model 200 may receive a fusion image 6 or 7 including optical coherence tomography image information and fluorescence lifetime image information, and output an analysis result 8 or 9 obtained by analyzing tissue components in the input image.

For example, when a fusion image 6 obtained from an atherosclerotic plaque blood vessel is input, the analysis device 100 may classify the fusion image into components of atherosclerotic plaque tissue, and output an analysis result 8 including a quantitative proportion of each tissue component. The analysis result 8 may include lipids, fibrous plaques, and normal. The analysis device 100 may estimate an inflammatory response based on quantitative information of macrophages among the tissue components, and classify tissue containing macrophages as inflammatory tissue or lipid tissue mixed with inflammation.

Meanwhile, when a fusion image 7 obtained from a normal blood vessel is input, the analysis device 100 may output an analysis result 9 in which tissue is classified as normal tissue.

Figure 7:
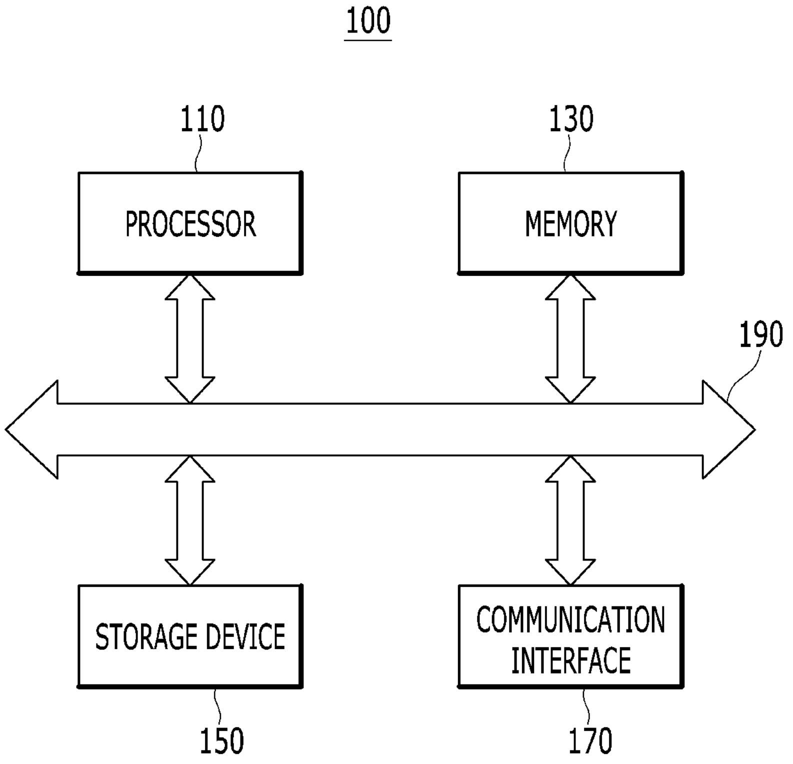
FIG. 7 is a hardware configuration diagram of an analysis device according to an exemplary embodiment.

FIG. 7 is a hardware configuration diagram of an analysis device according to an exemplary embodiment.

Referring to FIG. 7, the analysis device 100 may be implemented as a computing device operated by at least one processor. The analysis device 100 may include one or more processors 110, a memory 130 that loads computer programs to be executed by the processors 110, a storage device 150 that stores computer programs and various kinds of data, a communication interface 170, and a bus 190 connecting them. In addition, the analysis device 100 may further include various components.

The processors 110, which are devices that control the operations of the analysis device 100, may be various types of processors that process instructions included in computer programs, including at least one of, for example, a central processing unit (CPU), a micro processor unit (MPU), a micro controller unit (MCU), a graphic processing unit (GPU), and any type of processor well known in the art to which the present disclosure pertains.

The memory 130 stores various kinds of data, commands and/or information. The memory 130 may load computer programs from the storage device 150 so that instructions described to execute the operations according to the present disclosure are processed by the processor 110. The memory 130 may be, for example, a read only memory (ROM), a random access memory (RAM), or the like.

The storage device 150 may non-temporarily store computer programs and various kinds of data. The storage device 150 may include a non-volatile memory such as a read only memory (ROM), an erasable programmable ROM (EPROM), an electrically erasable programmable ROM (EEPROM), or a flash memory, a hard disk, a removable disk, or any type of computer-readable recording medium well known in the art to which the present disclosure pertains.

The communication interface 170 may be a wired/wireless communication module that supports wired/wireless communication.

The bus 190 provides a communication function between the components of the analysis device 100.

The computer programs include instructions to be executed by the processor 110, and are stored on a non-transitory computer readable storage medium, the instructions causing the processor 110 to execute the operations according to the present disclosure. The computer programs may be downloaded over a network or sold in the form of products. The artificial intelligence model 200 may be implemented as a computer program to be executed by the processor 110.

As described above, the analysis device according to the present disclosure is capable of detecting atherosclerotic plaques by quantitatively analyzing components of atherosclerotic plaque tissue, and particularly, predicting a possibility of rupture of atherosclerotic plaques by analyzing an inflammatory response.

The analysis device according to the present disclosure is capable of acquiring a fusion image and simultaneously providing quantitative and comprehensive information about lipids, macrophages, smooth muscle cells, fibrous plaques, etc., which are components of atherosclerotic plaque tissue.

By detecting atherosclerotic plaques and predicting a possibility of rupture, the analysis device according to the present disclosure can be used in diagnosing a cardiovascular disease, can contribute to personalized treatment, and can contribute to increasing pathophysiological understanding of atherosclerotic plaques.

The exemplary embodiments of the present disclosure described above are not only implemented through devices and methods, but may also be implemented through programs for implementing the functions corresponding to the configurations according to the exemplary embodiments of the present disclosure or a recording medium on which the programs are recorded.

Although the exemplary embodiments of the present disclosure have been described in detail above, the scope of the present disclosure is not limited thereto. Various modifications and improvements made by those skilled in the art using the basic concept of the present disclosure defined in the appended claims also fall within the scope of the present disclosure.

The invention claimed is:

1. An operation method of an analysis device operated by at least one processor, the operation method comprising:

receiving a fusion image; and classifying tissue components in the fusion image using an artificial intelligence model, wherein the fusion image includes first information obtained by imaging vascular tissue through an optical coherence tomography device, and second information obtained by imaging the vascular tissue through a fluorescence lifetime imaging device, and the artificial intelligence model is a model trained to classify tissue components using structural features and fluorescence lifetime image information included in an input image.

2. The operation method of claim 1, wherein the artificial intelligence model includes:

a convolutional neural network (CNN) model which is trained to receive an optical coherence tomography image included in the input image and extract structural features from the optical coherence tomography image; and a classifier which is trained to receive the structural features output from the CNN model and the fluorescence lifetime image information included in the input image, and output tissue components for the input image, and the optical coherence tomography image input to the CNN model represents the first information included in the fusion image in a polar coordinate domain.

3. The operation method of claim 1, wherein the artificial intelligence model is implemented as an extended CNN model that receives multimodal images representing parameters included in the first information and the second information, and extracts feature values of the multimodal images.

4. The operation method of claim 3, wherein the extended CNN model is of a U-net structure.

5. The operation method of claim 1, wherein the second information includes fluorescence lifetime images of multi-channels mapped to emission light having different wavelengths, and each of the fluorescence lifetime images includes a fluorescence lifetime and a fluorescence intensity acquired in a corresponding one of the channels.

6. The operation method of claim 1, wherein the tissue components include at least one of lipids, macrophages, smooth muscle cells, fibrous plaques, calcium, cholesterol crystals, and normal blood vessel walls.

7. The operation method of claim 1, further comprising:

estimating an inflammatory response based on quantitative information of macrophages among the tissue components in the fusion image, and classifying tissue containing the macrophages as inflammatory tissue or lipid tissue mixed with inflammation.

8. The operation method of claim 1, further comprising:

detecting atherosclerotic plaques based on the tissue components in the fusion image.

9. The operation method of claim 8, further comprising:

predicting a possibility of rupture of the atherosclerotic plaques based on the tissue components in the fusion image.

10. The operation method of claim 9, wherein in the predicting of the possibility of rupture, the possibility of rupture is predicted based on a ratio between tissue components that increase the possibility of rupture and tissue components that contribute to stabilization, among the tissue components in the fusion image.

11. The operation method of claim 1, further comprising:

extracting the structural features of the vascular tissue from the first information;

classifying the tissue components of the vascular tissue using the structural features and fluorescence lifetime information included in the second information; and detecting atherosclerotic plaques based on the tissue components of the vascular tissue.

12. The operation method of claim 11, wherein the second information includes fluorescence lifetime images of multi-channels mapped to emission light having different wavelengths, and each of the fluorescence lifetime images includes a fluorescence lifetime and a fluorescence intensity acquired in a corresponding one of the channels.

13. The operation method of claim 11, wherein the tissue components include at least one of lipids, macrophages, smooth muscle cells, fibrous plaques, calcium, cholesterol crystals, and normal blood vessel walls.

14. The operation method of claim 11, further comprising:

estimating an inflammatory response based on quantitative information of macrophages among the tissue components of the vascular tissue, and classifying tissue containing the macrophages as inflammatory tissue or lipid tissue mixed with inflammation.

15. The operation method of claim 11, further comprising:

predicting a possibility of rupture of the atherosclerotic plaques based on the tissue components of the vascular tissue.

16. The operation method of claim 15, wherein in the predicting of the possibility of rupture, the possibility of rupture is predicted based on a ratio between tissue components that increase the possibility of rupture and tissue components that contribute to stabilization, among the tissue components in the fusion image.

* * * * *